United States Patent
Lee et al.

(10) Patent No.: US 9,769,661 B2
(45) Date of Patent: Sep. 19, 2017

(54) WIRELESS NETWORK FAST AUTHENTICATION / ASSOCIATION USING RE-ASSOCIATION OBJECT

(71) Applicant: QUALCOMM Incorporated, San Diego, CA (US)

(72) Inventors: Soo Bum Lee, San Diego, CA (US); Jouni Kalevi Malinen, Tuusula (FI); Anand Palanigounder, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/680,023

(22) Filed: Apr. 6, 2015

(65) Prior Publication Data
US 2016/0295409 A1    Oct. 6, 2016

(51) Int. Cl.
| | | |
|---|---|---|
| *H04W 88/02* | (2009.01) | |
| *H04W 12/06* | (2009.01) | |
| *H04W 12/04* | (2009.01) | |
| *H04L 29/06* | (2006.01) | |
| *H04W 88/08* | (2009.01) | |
| *H04W 84/12* | (2009.01) | |

(52) U.S. Cl.
CPC ......... *H04W 12/06* (2013.01); *H04L 63/0428* (2013.01); *H04W 12/04* (2013.01); *H04W 84/12* (2013.01); *H04W 88/08* (2013.01)

(58) Field of Classification Search
CPC .................................................. H04W 88/02
See application file for complete search history.

(56) References Cited

U.S. PATENT DOCUMENTS

| | | | |
|---|---|---|---|
| 7,480,939 B1 * | 1/2009 | Nessett | H04L 9/083 380/247 |
| 8,081,759 B2 | 12/2011 | Faccin et al. | |
| 2003/0166397 A1 * | 9/2003 | Aura | H04L 63/0823 455/410 |
| 2004/0103282 A1 * | 5/2004 | Meier | G06Q 20/3674 713/171 |
| 2004/0240412 A1 | 12/2004 | Winget et al. | |
| 2004/0243846 A1 * | 12/2004 | Aboba | H04W 12/06 726/4 |

(Continued)

OTHER PUBLICATIONS

Akin D., et al., "Robust Security Network (RSN) Fast BSS Transition (FT)," White Paper, Certified Wireless Network Professional, Sep. 2008, Version 2.03, pp. 1-32.

(Continued)

*Primary Examiner* — Jason C Chiang
(74) *Attorney, Agent, or Firm* — Arent Fox LLP

(57) ABSTRACT

A method, an apparatus, and a computer program product for wireless communication are provided. The apparatus may be a STA. The STA sends, in a re-association procedure, a re-association object to a first AP to establish a first security association with the first AP. The re-association object is encrypted by using a first key unknown to the STA. The re-association object includes a second key derived from a second security association in a previous association procedure between the STA and a second AP. The STA receives a response from the first AP indicating that the first security association has been successfully established. The STA authenticates the response.

36 Claims, 12 Drawing Sheets

(56) References Cited

U.S. PATENT DOCUMENTS

| | | | |
|---|---|---|---|
| 2005/0117524 A1* | 6/2005 | Lee | H04W 36/0016 370/254 |
| 2006/0187878 A1* | 8/2006 | Calhoun | H04W 36/0033 370/331 |
| 2006/0191000 A1* | 8/2006 | O'Hara, Jr. | H04L 63/062 726/12 |
| 2006/0256763 A1 | 11/2006 | Nguyen et al. | |
| 2007/0064647 A1* | 3/2007 | Prasad | H04L 63/0869 370/331 |
| 2008/0267407 A1* | 10/2008 | Vanderveen | H04L 9/083 380/277 |
| 2008/0295144 A1* | 11/2008 | Cam-Winget | H04L 63/08 726/1 |
| 2009/0300739 A1 | 12/2009 | Nice et al. | |
| 2010/0189258 A1* | 7/2010 | Kassab | H04L 9/0822 380/247 |
| 2014/0122242 A1 | 5/2014 | Stephenson et al. | |
| 2014/0181904 A1 | 6/2014 | Craig et al. | |
| 2015/0146524 A1* | 5/2015 | Jeong | H04W 28/0215 370/230 |
| 2015/0230245 A1* | 8/2015 | Choi | H04W 74/0816 370/329 |

OTHER PUBLICATIONS

International Search Report and Written Opinion—PCT/US2016/021604—ISA/EPO—Jun. 1, 2016.

\* cited by examiner

WIRELESS NETWORK FAST AUTHENTICATION / ASSOCIATION USING RE-ASSOCIATION OBJECT

BACKGROUND

Field

The present disclosure relates generally to communication systems, and more particularly, to techniques of fast authentication/association in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

With respect to WLANs in highly populated environments (e.g., WiFi hotspots in a highly populated city or subway stations), techniques for authentication/association may be improved. Existing caching-based solution, e.g., pairwise master key (PMK) caching, may not be effective or scalable due to a large number of simultaneous authentication/association requests and/or due to a large number of STA states that need to be kept at an AP. Thus, there is a need to provide fast authentication and association in such an environment.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

In an aspect of the disclosure, a method, a computer program product, and an apparatus are provided. The apparatus may be a STA. The STA sends, in a re-association procedure, a re-association object to a first AP to establish a first security association with the first AP. The re-association object is encrypted by using a first key unknown to the STA. The re-association object includes a second key derived from a second security association in a previous association procedure between the STA and a second AP. The STA receives a response from the first AP indicating that the first security association has been successfully established. The STA authenticates the response.

In an aspect of the disclosure, a method, a computer program product, and an apparatus are provided. The apparatus may be an AP. The AP receives, in a re-association procedure, a re-association object from a STA for establishing a first security association with the AP. The re-association object is encrypted by using a first key unknown to the STA. The re-association object includes a second key derived from a second security association in a previous association procedure between the STA and an AP. The AP authenticates the re-association object based on the first key and the second key. The AP establishes, in response to successfully authenticating the re-association object, the first security association with the STA. The AP sends a response to the STA indicating the established first security association.

DETAILED DESCRIPTION

Figure 1:
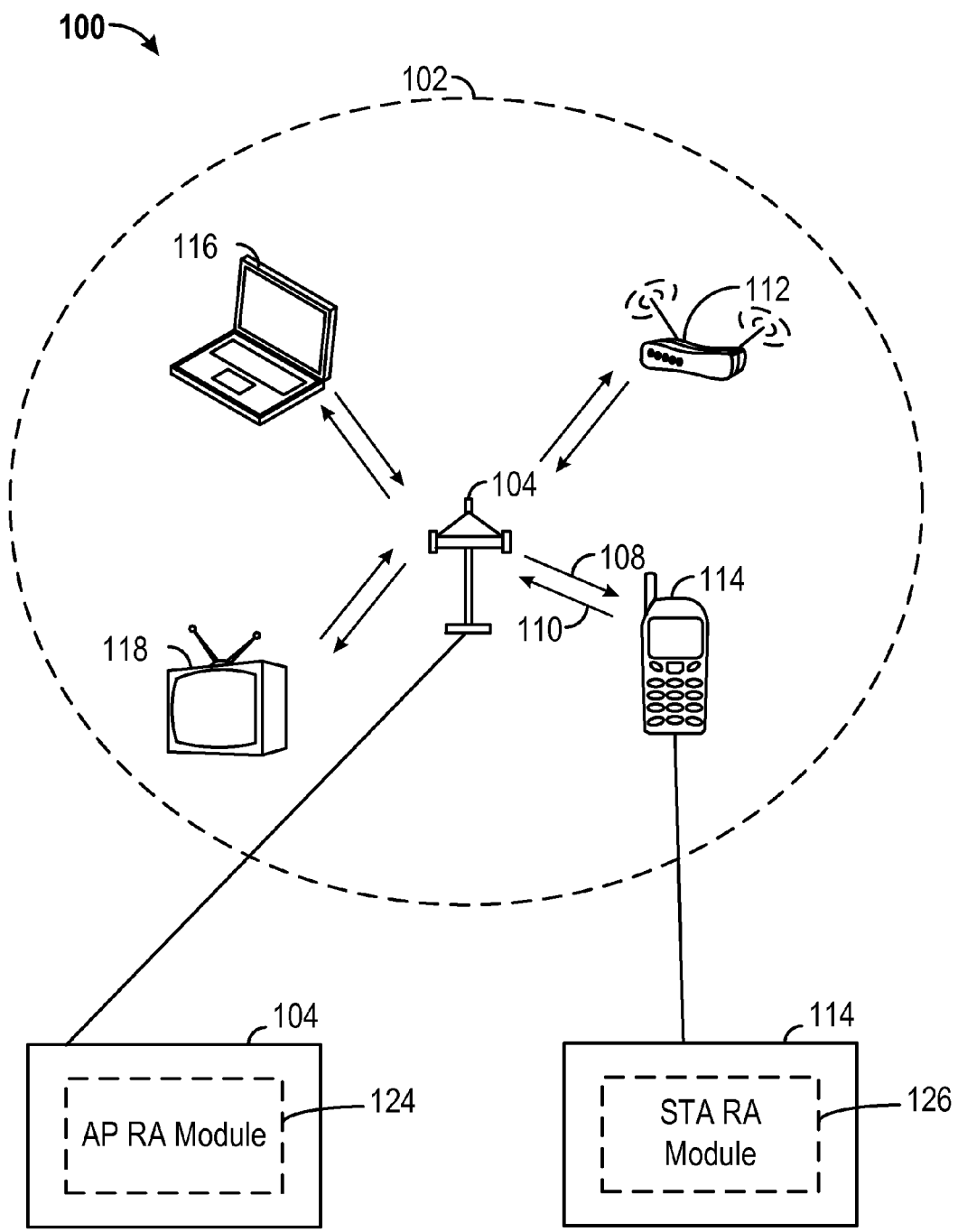
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more modules for performing various functions. For example, the AP 104 may include an AP re-association (RA) module 124 to perform procedures related to controlling the establishment of re-association. The AP RA module 124 may be configured to perform an association procedure with a STA including: (a) deriving a first key with the STA, and (b) establishing a security association between the AP and the STA corresponding to the first key. The AP RA module 124 may be configured to send a re-association object to the STA. The re-association object includes information regarding the security association and is encrypted with a second key unknown to the STA. The AP RA module 124 may be configured to perform a re-association procedure with the STA based on the re-association object.

In another aspect, the STA 114 may include one or more modules for performing various functions. For example, the STA 114 may include a STA RA module 126 to perform procedures related to controlling the establishment of re-association. The STA RA module 126 may be configured to perform an association procedure with at least one AP including: (a) deriving a first key with the at least one AP, and (b) establishing a security association between the STA and the at least one AP corresponding to the first key. The STA RA module 126 may be configured to receive a re-association object from the at least one AP. The re-association object includes information regarding the security association and is encrypted with a second key unknown to the STA. The STA RA module 126 may be configured to perform a re-association procedure with the at least one AP based on the re-association object.

Figure 2:
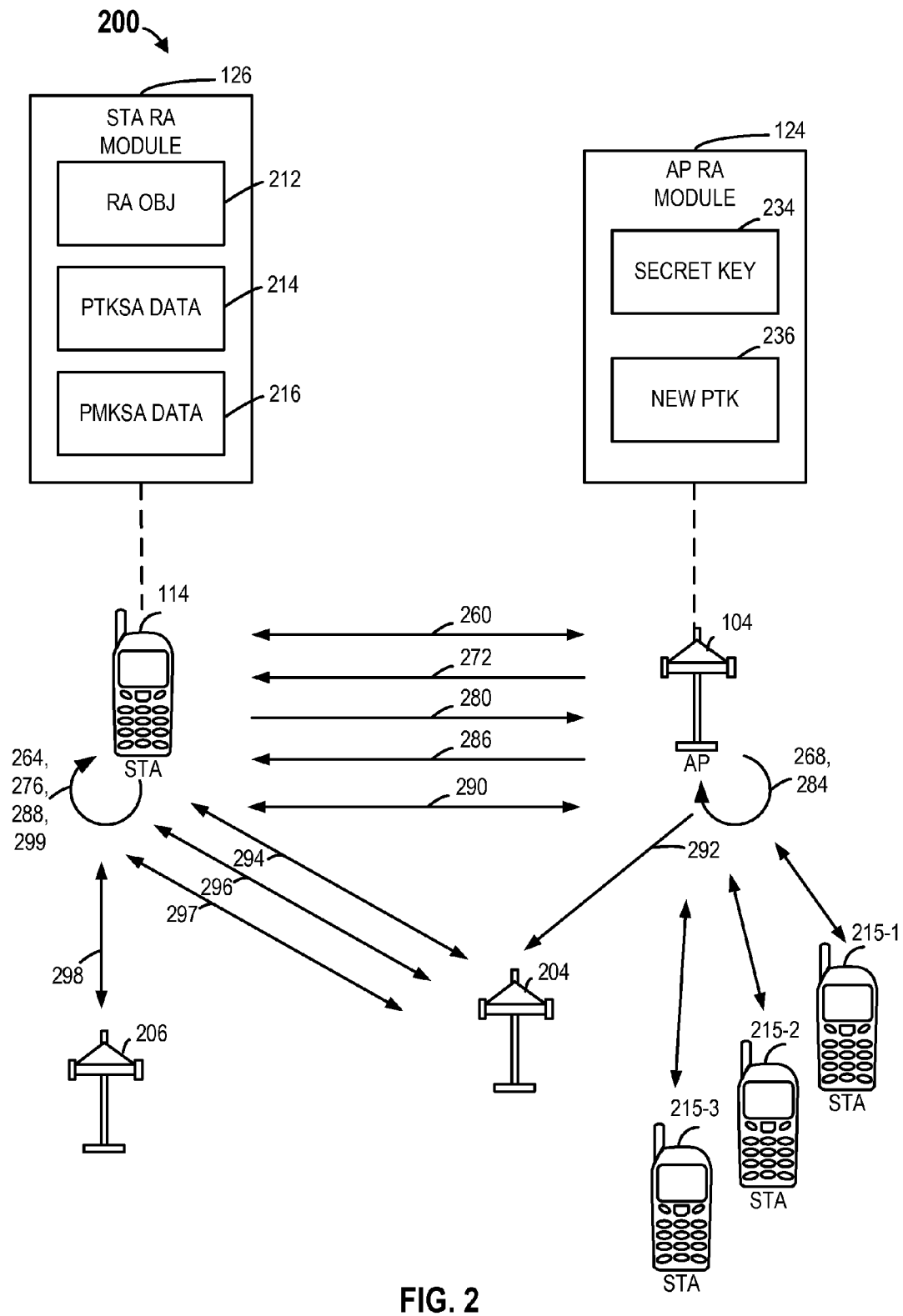
FIG. 2 is a diagram illustrating techniques of authentication and association in a wireless network.

FIG. 2 is a diagram 200 illustrating techniques of authentication and association in a wireless network (e.g., a WiFi network). The AP 104 provides access to a WLAN. The AP 104 may be in a highly populated area and a large number of STAs (e.g., the STAs 114, 215-1, 215-2, 215-3) may attempt to associate with the AP 104. Existing techniques may require a substantial amount time or substantial resources at the AP 104 in order to authenticate and associate each of the STAs.

Further, an AP 204 is in the same extended service set (ESS) or the same security domain (e.g., under a single administrative control) as the AP 104. An STA (e.g., the STA 114) that previously established a security association with the AP 104 may desire to establish a security association with the AP 204 using a simple procedure. On the other hand, an AP 206 is not in the same ESS or the same security domain. An STA (e.g., the STA 114) that previously established a security association with the AP 104 may still need to use a complete procedure to establish a security association with the AP 206.

As described supra, the STA 114 has a STA RA module 126. The AP 104 has an AP RA module 124, which include a secret key 234 that is unknown to the STA 114. At operation 260, the STA 114 establishes a security association with the AP 104. During the process of establishing the security association, the STA 114 and the AP 104 derive a PMK from an authentication server (AS) and establish a PMK security association (PMKSA). Further, the STA 114 and the AP 104 derive a pairwise transient key (PTK) and establish a PTK security association (PTKSA). At operation 264, the STA RA module 126 stores PTKSA data 214 at the STA RA module 126. The PTKSA data 214 include the PTK and other information regarding the PTKSA between the STA 114 and the AP 104. Further, the STA RA module 126 may choose to store the PMKSA data 216 at the STA RA module 126. The PMKSA data 216 include the PMK and other information regarding the PMKSA between the STA 114 and the AP 104.

At operation 268, the AP RA module 124 constructs a re-association object 212. The re-association object 212 may include, among other things, the PTKSA data 214 and PMKSA data 216. The AP 104 encrypts the re-association object 212 using the secret key 234. At operation 272, the AP 104 transmits the encrypted re-association object 212 to the STA 114. At operation 276, the STA 114 stores the encrypted re-association object 212 at the STA RA module 126. Subsequently, the STA 114 may disassociate with the AP 104.

In one configuration, at operation 280, the STA 114 transmits a re-association request message to the AP 104. The re-association request message includes the encrypted re-association object 212 and an authentication tag, e.g., a message integrity code (MIC), created using the PTK. At operation 284, the AP RA module 124 extracts the encrypted re-association object 212 from the re-association request message and then decrypts the encrypted re-association object 212 using the secret key 234. Then, the AP RA module 124 retrieves the PTKSA data and PMKSA data from the re-association object 212. Using the retrieved the PTK in PTKSA data, the AP verifies the authentication tag carried in the re-association message. Successful verification proves the STA's possession of PTK. At operation 286, the AP RA module 124 constructs a re-association response message and encrypts the re-association response message by using the PTK. The AP includes a group transient key (GTK) in the re-association response message. Then the AP 104 sends the encrypted re-association response message to the STA 114. At operation 288, the STA RA module 126 decrypts the encrypted re-association response message by using the PTK from the PTKSA data 214. At operation 290, the STA 114 and the AP 104 establish a security association and communicated data encrypted by using the PTK.

In one configuration, at operation 284, the AP RA module 124 generates a new PTK 236. At operation 286, the AP 104 additionally includes the new PTK 236 in the re-association object 212. At operation 290, the STA 114 and the AP 104 establish a security association and communicate data encrypted by using the new PTK 236.

In another configuration, the AP and the STA can derive a new PTK by running a 4-way handshake protocol based on the PMK in the PMKSA data (i.e., by rekeying via 4-way handshake).

In one configuration, the AP 104 and the AP 204 are in the same ESS or the same security domain (e.g., under a single administrative control). At operation 292, the AP 104 can share the secret key 234 with the AP 204. Subsequently, at operation 294, the STA 114 can use the encrypted re-association object 212 to establish a security association with the AP 204. The AP 204 can use the shared secret key 234 to decrypt the encrypted re-association object 212 and obtain data (e.g., the PTKSA data and PMKSA data) stored in the re-association object 212. At operation 296, the AP 204 and the STA 114 can communicate data securely (i.e., authenticate and encrypt/decrypt data) by using the PTK. In one configuration, the AP 104 can share the secret key 234 with multiple APs in the ESS or the same security domain. The STA 114 can then use the encrypted re-association object 212 to establish security associations with the multiple APs.

Further, each secret key of an AP may be associated (or identified) by a re-association identifier (RAID). When constructing the re-association object, the AP includes in the re-association object the RAID of the secret key used to construct the re-association object. Each of the APs 104, 204, and 206 may announce the RAID associated with the respective secret key used by the AP 104, 204, or 206. For example, the RAID can be included in an information element (IE) of a beacon frame transmitted by the AP 104, 204, or 206. Upon receiving the RAID (e.g., through a beacon frame) from an AP 104, 204, or 206, the STA 114 can determine whether a stored re-association object has the same RAID and may be used for fast re-association. In other words, the STA 114 may determine whether the AP 104, 204, or 206 is using a shared secret key and whether a re-association object encrypted using the shared key (i.e., having the same RAID) is already stored at the STA 114. If the STA 114 found such a re-association object, the STA can send the re-association object to the AP 104, 204, or 206 for fast authentication/association.

In certain circumstances, the STA 114 may not be able to determine whether the AP 104, 204, or 206 is using a shared secret key initially. The STA 114 may perform a full procedure to establish a security association with the AP 104, 204, or 206. Accordingly, the STA 114 may receive, at operation 297, a re-association object from the AP 204 through a security association operation. Similarly, the STA 114 may receive, at operation 298, a re-association object from the AP 206 through a security association operation. The AP 206 may not be in the same ESS as the AP 104 and the AP 204. Upon receiving a re-association object, at operation 299, the STA 114 may determine whether the received re-association object is encrypted using a shared secret key. Particularly, the STA 114 may determine whether the received re-association object is encrypted by using a key that is the same as a key using which a re-association object already stored at the STA is encrypted. As discussed, a secret key of an AP may be associated (or identified) by an RAID. Thus, the STA 114 may determine based on the RAIDs that the re-association object from the AP 204 is associated with the same secret key as the re-association object of the AP 104. The STA 114 may choose not to store the re-association object received from the AP 204. Further, the STA 114 may determine based on the RAIDs that the re-association object received from the AP 206 is associated with a different secret key. Accordingly, the STA 114 may choose to store the re-association object received from the AP 206. In other words, upon receiving a re-association object, the STA 114 retrieves the RAID of the newly received re-association object and checks the whether the retrieved RAID is the same as the RAID of a stored re-association object. If the STA determined that a stored re-association object has the same RAID, the STA can discard the newly received re-association object. That is, if the received re-association object is encrypted using the same key, the STA 114 may discard the received re-association object. If the received re-association object is not encrypted using the same key, the STA 114 may store the received re-association object.

Figure 3:
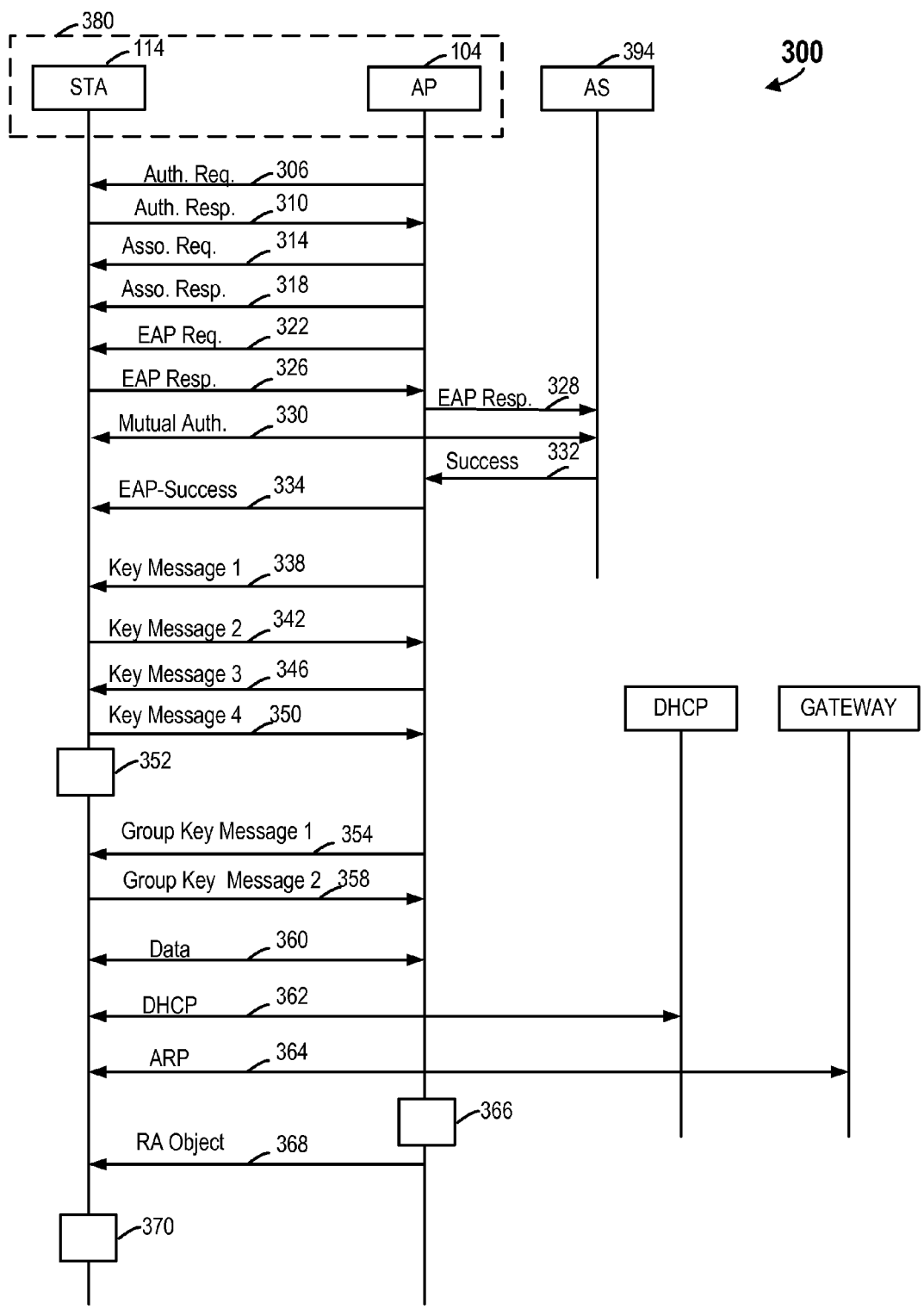
FIG. 3 is a diagram illustrating communications among wireless devices to establish a security association in a wireless network.

FIG. 3 is a diagram 300 illustrating communications among wireless devices to establish a security association in a wireless network. The AP 104 may operate a BSS 380. The STA 114 may wish to join the BSS 380. The STA 114 and the AP 104 utilize an authentication process to establish their identity to a mutually acceptable level. At operation 306, the STA 114 sends an authentication frame requesting open system authentication. At operation 310, the AP 104 responds with an authentication frame indicating status "success."

Before the STA 114 is allowed to send data via the AP 104, the STA 114 must associate with the AP 104. Association provides a mapping between the STA 114 and the AP 104 that allows messages within the distribution system to reach the AP 104 with which the STA 114 is associated and ultimately the STA 114 itself. At operation 314, the STA 114 sends an association request to the AP 104. If the STA 114 is admitted, at operation 318, the AP 104 responds with an association response. With the association request and response exchange, the STA 114 and AP 104 exchange capability information (support for optional features) and the AP 104 informs the STA 114 of specific operating parameters within the BSS 380.

IEEE 802.1X is an IEEE Standard for Port-based Network Access Control (PNAC). It is part of the IEEE 802.1 group of networking protocols. IEEE 802.1X provides an authentication mechanism to devices wishing to attach to a LAN or WLAN. With IEEE 802.1X, a station desiring access to a BSS authenticates with an AS 394 using the extensible authentication protocol (EAP). The AS 394 may be co-located with the AP or may be a separate system. IEEE 802.1X defines the protocol framework and encapsulation method for authentication but does not dictate the actual authentication method used. The method used is negotiated during the IEEE 802.1X exchange with the AS 394 and numerous methods are supported, some examples being EAP-Transport Layer Security (EAP-TLS), the Lightweight Extensible Authentication Protocol (LEAP), and EAP-MDS.

Subsequent to operation 318, the AP 104 sends, at operation 322, an EAP request, challenging the STA 114 to identify itself. At operation 326, the STA 114 responds with an EAP response to the AP 104. At operation 328, the AP 104 forwards the EAP response to the AS 394. At operation 330, an EAP authentication exchange is executed between the STA 114 and the AS 394. During the operation 330, the AP 104 receives messages from the STA 114 or the AS 394 and, then, re-encapsulates and forwarding the messages to the other party. If the STA 114 successfully authenticates, the AS 394, at operation 332, sends a message to the AP 104 indicating the success, together with information for a PMK. At operation 334, the AP 104 forwards an EAP-Success message to the STA 114, signaling successful completion of the authentication.

If authentication fails, the AS 394 informs the AP 104 and the AP sends an EAP-Failure message to the station followed by a disassociation frame. Subsequently, the AP 104 and the STA 114 negotiate to generate a PTK to protect traffic between the AP and an individual station and a GTK to protect the broadcast and multicast traffic sent by the AP.

In one technique, a four-way handshake can be used to distribute the PTK and GTK and a two-way handshake to distribute the GTK when sent alone. Note that the PTK itself may not be sent, only information which, together with pre-shared information, can be used by both sides to derive the PTK. At operation 338, the AP 104 sends a first key message to the STA 114. The first key message may carry an ANonce, which is a random number generated by the AP 104 and used only once. On receipt of the first key message, the STA 114 generates a random number called the SNonce.

Using the information in the first key message (including the ANonce), the SNonce, and knowledge of the PMK, the STA 114 can derive the PTK.

At operation 342, the STA 114 sends a second key message to the AP 104. The second key message carries the SNonce generated by the STA 114. Using the information in second key message (including the SNonce), the ANonce, and knowledge of the PMK, the AP 104 derives the PTK. The second key message also carries a MIC generated using the PTK and by which the STA 114 demonstrates to the AP 104 that it knows the PMK.

At operation 346, the AP 104 sends a third key message to the STA 114. The third key message may carry a GTK, if it is needed, encrypted using the PTK. The third key message may also carry a MIC by which the AP 104 demonstrates to the STA 114 that the AP 104 knows the PMK. By sending the third key message, the AP 104 indicates that the AP 104 is satisfied that the STA 114 station is who it says it is.

At operation 350, the STA 114 sends a fourth key message to the AP 104. The STA 114 confirms receipt of the GTK (if included in the third key message) and that the STA 114 is satisfied that the AP 104 is who it says it is. With the successful delivery of the fourth key message to the AP 104, a secure session is established between the AP 104 and the STA 114. Data frames can now be encrypted in both directions using the PTK.

As such, the STA 114 and the AP 104 have established a PMKSA and a PTKSA. Particularly, the STA 114 has sent device specific information (e.g., MAC address) to the AP 104. At operation 352, the STA 114 stores the PTKSA data 214, including the PTK and other information regarding the PTKSA between the STA 114 and the AP 104, at the STA 114 (e.g., in the STA RA module 126). For example, the PTKSA data 214 may include, in addition to the PTK, one or more of a PTK ID, the device identities of the STA 114 and the AP 104, and the MAC addresses of the STA 114 and the AP 104. In addition, the STA 114 may choose to store the PMKSA data 216, including the PMK and other information regarding the PMKSA between the STA 114 and the AP 104, at the STA 114 (e.g., in the STA RA module 126). For example, the PMKSA data 216 may include, in addition to the PMK, one or more of a PMK ID, the device identities of the STA 114 and the AP 104, and the MAC addresses of the STA 114 and the AP 104.

In one configuration, the GTK can be transmitted to the STA 114 from the AP 104 through a group key handshake. Specifically, at operation 354, the AP 104 sends a first group key message to the STA 114. The first group key message carries the GTK encrypted using the PTK. At operation 358, the STA 114 responds with a second group key message, confirming receipt.

The four-way handshake described supra is performed whenever the PTK is refreshed. The two-way group key handshake is performed when the GTK alone is refreshed. As such, the STA 114 and the AP 104 have created a robust security network association (RSNA). Subsequently, at operation 360, the STA 114 and the AP 104 can communicate data that is encrypted by using the PTK.

In addition, at operation 362, the STA 114 can communicate, via the AP 104, with a DHCP server 396 to obtain a dynamic Internet protocol (IP) address. Further, at operation 364, the STA 114 can communicate with devices in another network via a gateway 398 using address resolution protocol (ARP) messages.

Further, the AP 104 may construct a re-association object 212 to facilitate the re-association of the STA 114 with the AP 104. The construction of the re-association object 212 my start at any time point at the AP 104. In this example, at operation 366, the AP 104 constructs a re-association object 212.

Figure 4:
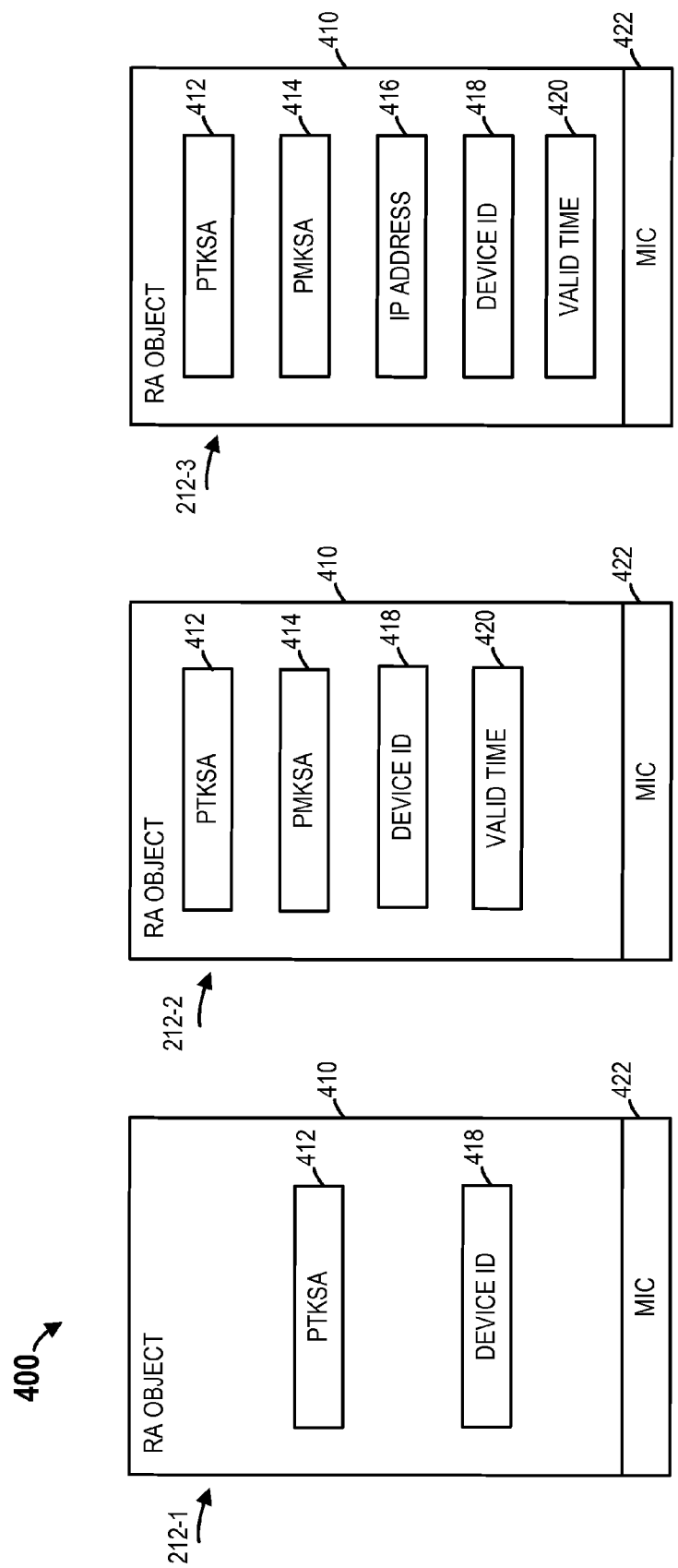
FIG. 4 is a diagram illustrating a re-association object.

FIG. 4 is a diagram 400 illustrating re-association objects 212-1, 212-2, 212-3 in accordance with various configurations. Each of the re-association objects 212-1, 212-2, 212-3 includes a re-association data section 410 and optionally a MIC section 422. In one configuration, the re-association data section 410 of the re-association object 212-1 includes a PTKSA field 412 and a device ID field 418. In another configuration, the re-association data section 410 of the re-association object 212-2 includes the PTKSA field 412 and the device ID field 418 as well as optional fields of a PMKSA field 414, an IP address field 416, and a valid time field 420. In yet another configuration, the re-association data section 410 of the re-association object 212-3 includes the PTKSA field 412 and the device ID field 418 as well as optional fields of the PMKSA field 414, the valid time field 420, and an IP address field 416.

Referring back to FIG. 3, in this example, at operation 366, the AP 104 constructs the re-association object 212. The AP 104 stores the PTKSA data 214, including the PTK and other information regarding the PTKSA between the STA 114 and the AP 104, in the PTKSA field 412. For example, the PTKSA data 214 may include, in addition to the PTK, one or more of the PTK ID, the device identities of the STA 114 and the AP 104, and the MAC addresses of the STA 114 and the AP 104.

In one configuration and optionally, the AP 104 can store the PMKSA data 216, including the PMK and other information regarding the PMKSA between the STA 114 and the AP 104, in the PMKSA field 414. For example, the PMKSA data 216 may include, in addition to the PMK, one or more of the PMK ID, the device identities of the STA 114 and the AP 104, and the MAC addresses of the STA 114 and the AP 104.

In one configuration and optionally, the AP 104 can store the IP address assigned to the STA 114 by the DHCP server 396 in the IP address field 416.

In one configuration and optionally, the AP 104 can store information identifying the STA 114 in the device ID field 418. For example, the information can be the MAC address of the STA 114 or a unique identifier that can be used to identify the STA 114.

In one configuration and optionally, the AP 104 can store information indicating a valid time period for using the re-association object 212 in the valid time field 420. For example, the information can be a timestamp indicating the expiration time of the re-association object 212. The AP 104 can also store in the valid time field 420 a timestamp indicating the time point at which the re-association object 212 is constructed.

Further, the AP 104 can encrypt the data fields 412, 414, 416, 418, 420 using the secret key 234 and generate an encrypted re-association data section 410. The secret key 234 is unknown to the STA 114.

In one configuration and optionally, the AP 104 can use a MIC algorithm and the secret key 234 to calculate an integrity code of the encrypted re-association data section 410. The AP 104 can store the integrity code in the MIC section 422.

At operation 368, the AP 104 sends the encrypted re-association object 212 to the STA 114. Upon receiving the encrypted re-association object 212, at operation 370, the STA 114 stores the encrypted re-association object 212 and information relevant to the encrypted re-association object 212. For example, the information may indicate the identity of the AP 104 that issued the encrypted re-association object 212.

Figure 5:
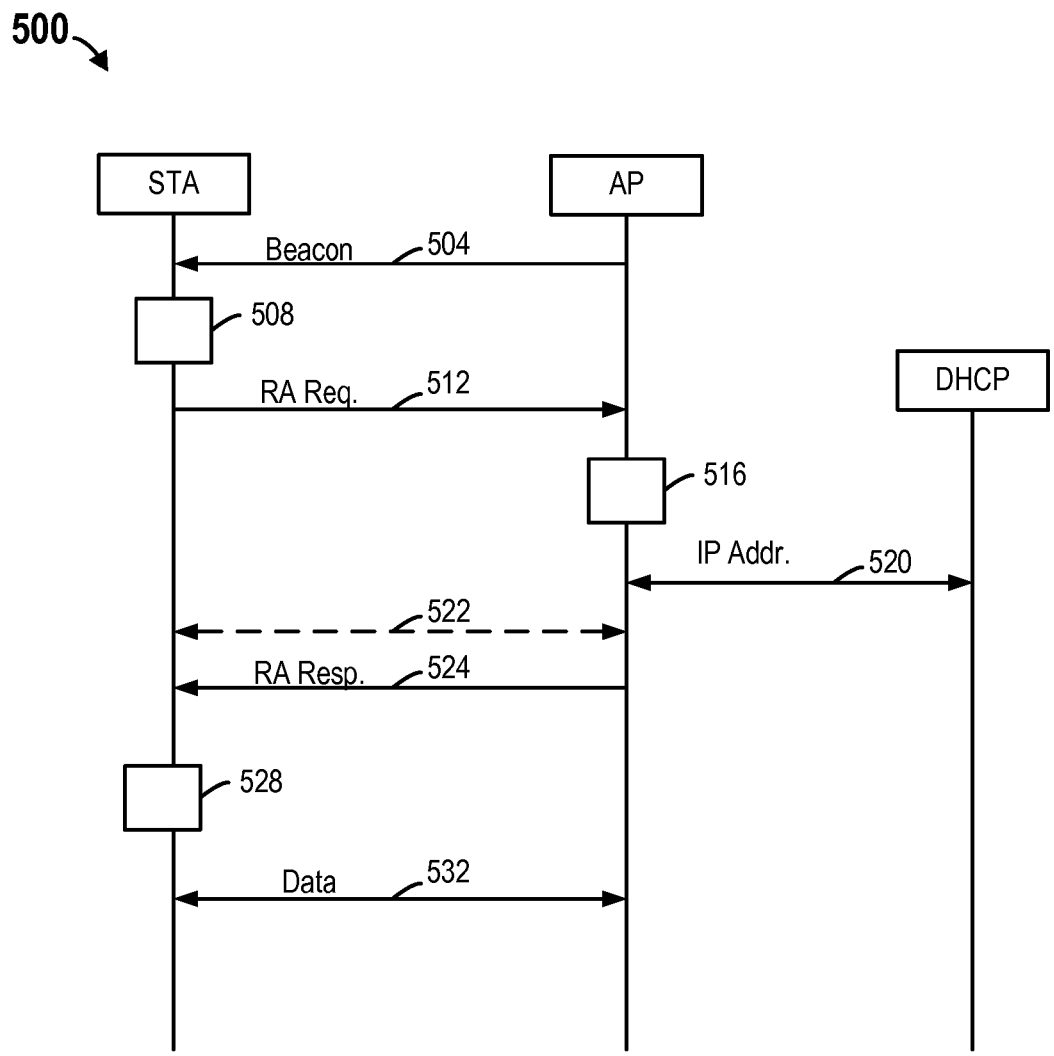
FIG. 5 is a diagram illustrating communications among wireless devices to establish a security re-association in a wireless network.

FIG. 5 is a diagram 500 illustrating communications among wireless devices to establish a security re-association in a wireless network. At operation 504, the AP 104 periodically transmits beacon frames. The STA 114, at operation 308, executes a scanning operation to discover the BSS 380 and the attributes associated with the BSS 380. The STA 114 may detect the beacon frame transmitted by the AP 104. The beacon frame carries regulatory information, capability information, and information for managing the BSS. Thus, the STA 114 can obtain the identities of the AP 104 and the BSS 380 from the beacon frame. The STA 114 may have stored one or more re-association objects from different APs. The STA 114 may use information regarding the identities of the AP 104 and the BSS 380 to search the re-association objects stored at the STA 114 and to determine whether a re-association object issued by the AP 104 is stored at the STA 114. If the STA 114 is able to obtain a re-association object issued by the AP 104, the STA 114 can use that re-association object to establish a re-association with the AP 104.

Figure 6A:
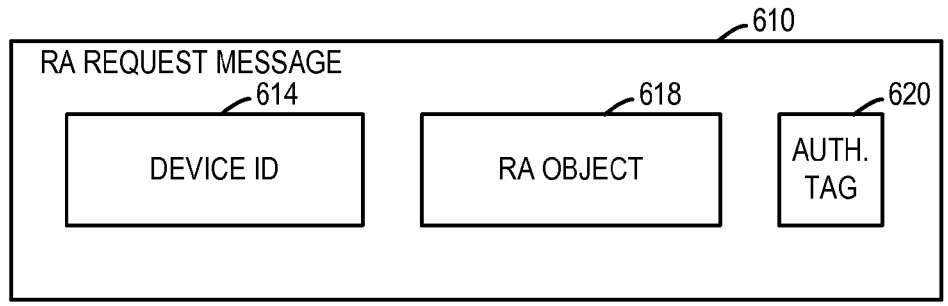
FIG. 6(A) is a diagram illustrating a re-association request message.

At operation 512, the STA 114 may construct and send a re-association request message to the AP 104. FIG. 6(A) is a diagram 600 illustrating a re-association request message. A re-association request message 610 includes a device ID field 614, a re-association object field 618, and an authentication tag field 620. The device ID field 614 is used to carry information identifying a sender of the re-association request message 610. The re-association object field 618 is used to carry a re-association object issued by an AP. The authentication tag field 620 can be used to carry a MIC of the re-association object calculated by using a PTK derived by the AP and the STA.

Referring back to FIG. 5, at operation 512, the STA 114 may construct a re-association request message 610. The STA 114 may store the MAC address of the STA 114 in the device ID field 614. Upon locating/obtaining the re-association object 212 issued by the AP 104 stored at the STA 114, the STA 114 may store the re-association object 212 in the re-association object field 618. Further, the STA 114 calculates a MIC of the re-association object 212 using the PTK and then stores the MIC in the authentication tag field 620.

Subsequently, the STA 114 sends the re-association request message 610 to the AP 104. For example, the re-association request message 610 can be sent through one or more data frames or management frames. After receiving the re-association request message 610, at operation 516, the AP 104 extracts the re-association object 212 from the re-association request message 610. Then, the AP 104 locates the encrypted re-association data section 410 and the MIC section 422. The AP 104 calculates an integrity code of the encrypted re-association data section 410 using the secret key 234. The AP 104 then compares the calculated integrity code with the integrity code extracted from the MIC section 422. If the two integrity codes do not match, the AP 104 can determine that the re-association object 212 is not valid at the AP 104.

If the two integrity codes match, the AP 104 attempts to use the secret key 234 to decrypt the encrypted re-association data section 410. If the AP 104 is unable to decrypt the encrypted re-association data section 410 using the secret key 234, the AP 104 can determine that the re-association object 212 is not valid at the AP 104.

If the AP 104 is able to decrypt the encrypted re-association data section 410 using the secret key 234, the AP 104 then extracts data from each field of the re-association object 212, which are now decrypted.

Particularly, the AP 104 can extract the PTK from the PTKSA field 412. Using the PTK, the AP 104 calculates a MIC of the re-association object 212 stored in the re-association object field 618. Then the AP 104 compares the calculated MIC with the MIC stored in the authentication tag field 620. If the MICs match, the AP 104 can determine that the STA 114 has the PTK stored in the re-association object 212. If the MICs do not match, the AP 104 can determine that the STA 114 do not have the PTK stored in the re-association object 212 and, consequently, that the re-association object 212 is not valid.

The AP 104 further determines whether data, such as those indicating expiration timestamp, are stored in the valid time field 420. The AP 104 then determines whether the re-association object 212 is still valid at the current time point based on the data. For example, if the current time point is after the expiration timestamp, the AP 104 can determine that the re-association object 212 is no longer valid.

Further, the AP 104 can extract data from the device ID field 418 and the device ID field 614 and then compares whether the data from both fields identity the same device. For example, the device ID field 418 and the device ID field 614 each may include data indicating a MAC address. The AP 104 may determine whether the MAC addresses are the same. If not, the AP 104 may determine that the re-association object is not issued to the STA sending the re-association object to the AP 104. Accordingly, the AP 104 can determine that the re-association object 212 is not valid.

On the other hand, upon determining that the re-association object 212 is valid, the AP 104 can extract data, if any, from each of the PTKSA field 412, the PMKSA field 414, and the IP address field 416. Accordingly, the AP 104 can obtain the PTK of a previous PTKSK between the STA 114 and the AP 104. In one configuration, using the PTK and the PTKSA data stored in the PTKSA field 412, the AP 104 can re-establish the PTKSA for the STA 114 at the AP 104. In one configuration, as will be described infra, the AP 104 may choose to generate a new PTK and use the new PTK to establish a new PTKSA with the STA 114.

Further, if an IP address is available from the IP address field 416, the AP 104 can determine that IP address was the IP address assigned to the STA 114 previously. At operation 520, the AP 104 can communicate with the DHCP server 396 to determine whether that IP address has been reassigned to another device. If not, the AP 104 can reacquire that IP address from the DHCP server 396 for the STA 114. Further, the AP 104 can determine the time point at which the re-association object 212 is constructed/issued. If the re-association object 212 was issued within a predetermined time period (e.g., five minutes), the AP 104 may choose to assume that the IP address is still assigned to the STA 114 without communicating with the DHCP server 396.

If an IP address is not available from the IP address field 416, at operation 520, the AP 104 can communicate with the DHCP server 396 to request a new IP address for the STA 114. Further, if the PMKSA DATA 216 is available from the PMKSA field 414, the AP 104 can obtain the PMK of a previous PMKSK between the STA 114 and the AP 104. Using the PMK and the PMKSA data stored in the PMKSA field 414, the AP 104 may choose to re-establish the PMKSA for the STA 114 at the AP 104.

At operation 524, the AP 104 operates to send a re-association response message to the STA 114. If the AP 104 has determined that the re-association object 212 is not valid, the AP 104 may construct a re-association response failure message including information indicating that the re-association operation has failed. The AP 104 may send the re-association response failure message without encryption. If the AP 104 has determined that the re-association object 212 is valid, the AP 104 may construct a re-association response success message including information indicating that the re-association operation has succeeded.

Figure 6B:
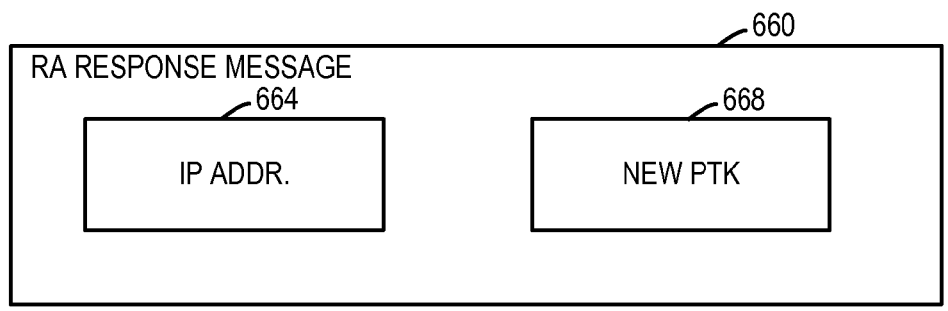
FIG. 6(B) is a diagram illustrating a re-association success response message.

FIG. 6(B) is a diagram 650 illustrating a re-association success response message. A re-association success response message 660 may include an IP address field 664 and a new PTK field 668. The IP address field 664 is used to carry an IP address assigned to the STA requesting re-association. The new PTK field 668 is used to carry a PTK to be used to establish a PTKSA.

Referring back to FIG. 5, at operation 524, the AP 104 may store the IP address assigned to the STA 114 in the IP address field 664. Further, in one configuration, optionally at operation 522 prior to operation 524, the AP 104 may choose to generate a new PTK. For example, the AP 104 and the STA 114 may choose to derive a new PTK through a four-way handshake using the PMKSA data as described supra, and accordingly establish a new PTKSA. Alternatively, the AP 104 may randomly generate a unique PTK, and establishes a new PTKSA for the STA 114 based on the randomly generated new PTK. The AP 104 can store the randomly generated new PTK in the new PTK field 668. Further, after the re-association success response message 660 is constructed, in one configuration, the AP 104 may encrypt the re-association success response message 660 using the PTK obtained from the re-association object 212 (i.e., the PTK derived from a previous association). In another configuration, if the STA 114 established a new PTKSA through a four-way handshake with the AP 104 in operation 522, the AP 104 may encrypt the re-association success response message 660 using the new PTK derived in operation 522. Then the AP 104 sends the encrypted re-association success response message 660 to the STA 114.

After receiving the re-association response message, at operation 528, the STA 114 determines whether the re-association operation is successful. If the STA 114 receives a re-association response failure message, the STA 114 determines that the re-association operation is not successful and may use the procedure described with respect to the FIG. 3 to establish a security association with the AP 104.

If the STA 114 receives a re-association success response message 660, within operation 528, in one configuration, the STA 114 may then attempt to use the PTK from the PTKSA data 214 to decrypt the re-association success response message 660. In another configuration, if the STA 114 established a new PTKSA through a four-way handshake with the AP 104 in operation 522, the STA 114 may then attempt to use the new PTK derived in operation 522 to decrypt the re-association success response message 660. If the STA 114 is able to decrypt the re-association success response message 660, the STA 114 can determine that the AP 104 was able to decrypt the re-association object 212 and obtain the PTK from the PTKSA field 412. Accordingly, the STA 114 can confirm the identity of the AP 104 (i.e., the AP that sent the re-association object 212). The STA 114 can then determine that the re-association operation is successful. After successfully decrypting the re-association success response message 660, the STA 114 can obtain the IP address from the IP address field 664 and use the IP address as the IP address of the STA 114.

Further, if the STA 114 detects that there is a new PTK in the new PTK field 668, the STA 114 may use the new PTK to complete establishing the new PTKSA with the AP 104. Accordingly, at operation 532, the STA 114 and the AP 104 can communicate data encrypted using the new PTK. If there is no new PTK in the re-association success response message 660 and the STA 114 did not establish a new PTKSA through a four-way handshake with the AP 104 in operation 522, the STA 114 may use the previous PTK from the PTKSA data 214 to complete re-establishing the PTKSA with the AP 104. Accordingly, at operation 532, the STA 114 and the AP 104 can communicate data encrypted using the previous PTK.

Figure 7:
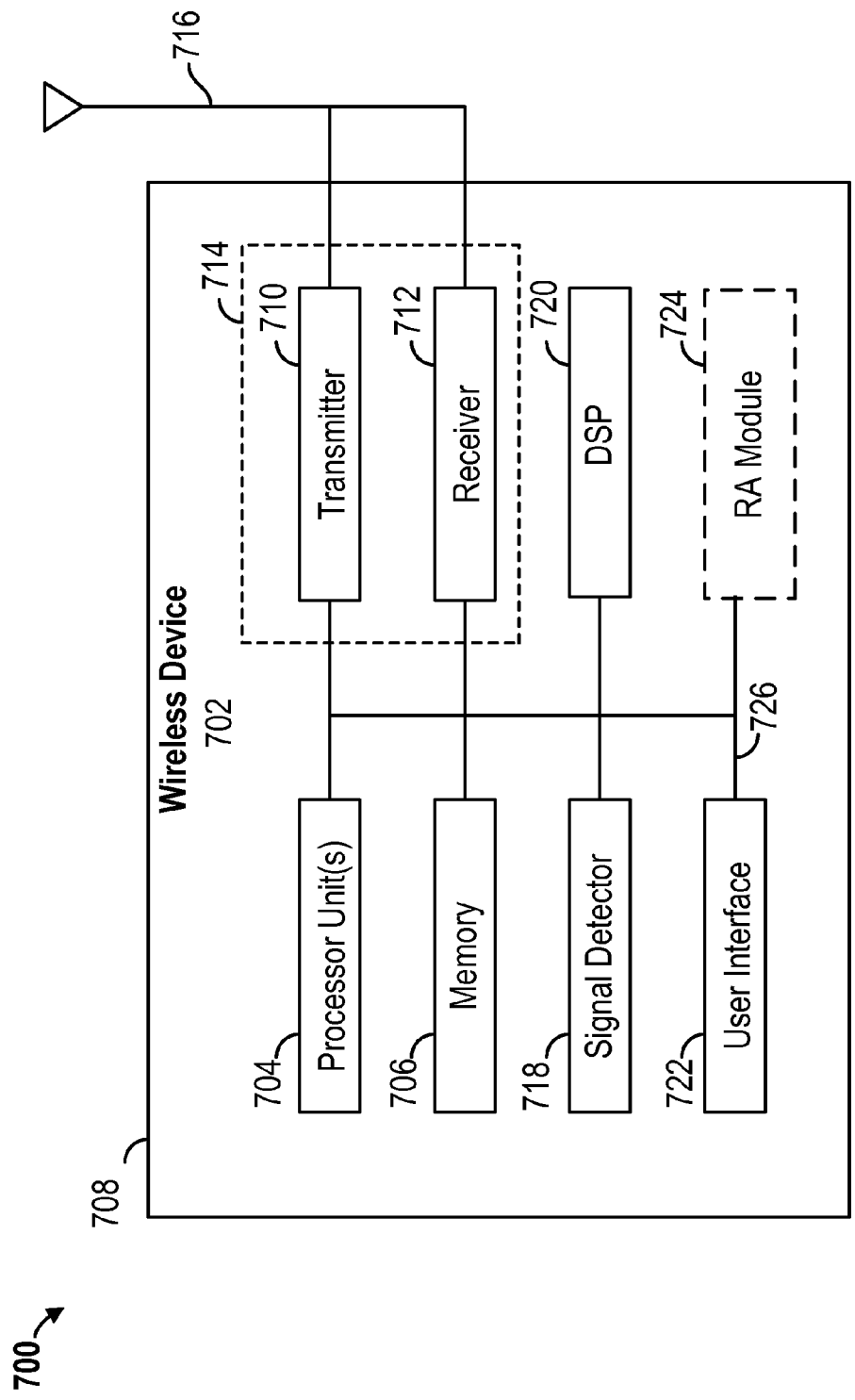
FIG. 7 shows an example functional block diagram of a wireless device that may be employed within the wireless communication system of FIG. 1.

FIG. 7 shows an example functional block diagram of a wireless device 702 that may be employed within the wireless communication system 100 of FIG. 1. The wireless device 702 is an example of a device that may be configured to implement the various methods described herein. For example, the wireless device 702 may comprise the AP 104 or one of the STAs 112, 114, 116, and 118.

The wireless device 702 may include a processor 704 which controls operation of the wireless device 702. The processor 704 may also be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The processor 704 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708 that may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include (not shown) multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a digital signal processor (DSP) 720 for use in processing signals. The DSP 720 may be configured to generate a packet for transmission. In some aspects, the packet may comprise a physical layer data unit (PPDU).

The wireless device 702 may further comprise a user interface 722 in some aspects. The user interface 722 may comprise a keypad, a microphone, a speaker, and/or a display. The user interface 722 may include any element or component that conveys information to a user of the wireless device 702 and/or receives input from the user.

When the wireless device 702 is implemented as a STA (e.g., STA 114), the wireless device 702 may also comprise a RA module 724. The RA module 724 may be configured to perform an association procedure with at least one AP including: (a) deriving a first key with the at least one AP, and (b) establishing a security association between the STA and the at least one AP corresponding to the first key. The RA module 724 may be configured to receive a re-association object from the at least one AP. The re-association object includes information regarding the security association and is encrypted with a second key unknown to the STA. The RA module 724 may be configured to perform a re-association procedure with the at least one AP based on the re-association object.

When the wireless device 702 is implemented as an AP (e.g., AP 104), the wireless device 702 may also comprise a RA module 724. The RA module 724 may be configured to perform an association procedure with a STA including: (a) deriving a first key with the STA, and (b) establishing a security association between the AP and the STA corresponding to the first key. The RA module 724 may be configured to send a re-association object to the STA. The re-association object includes information regarding the security association and is encrypted with a second key unknown to the STA. The RA module 724 may be configured to perform a re-association procedure with the STA based on the re-association object.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the RA module 724. Further, each of the components illustrated in FIG. 7 may be implemented using a plurality of separate elements.

Figure 8:
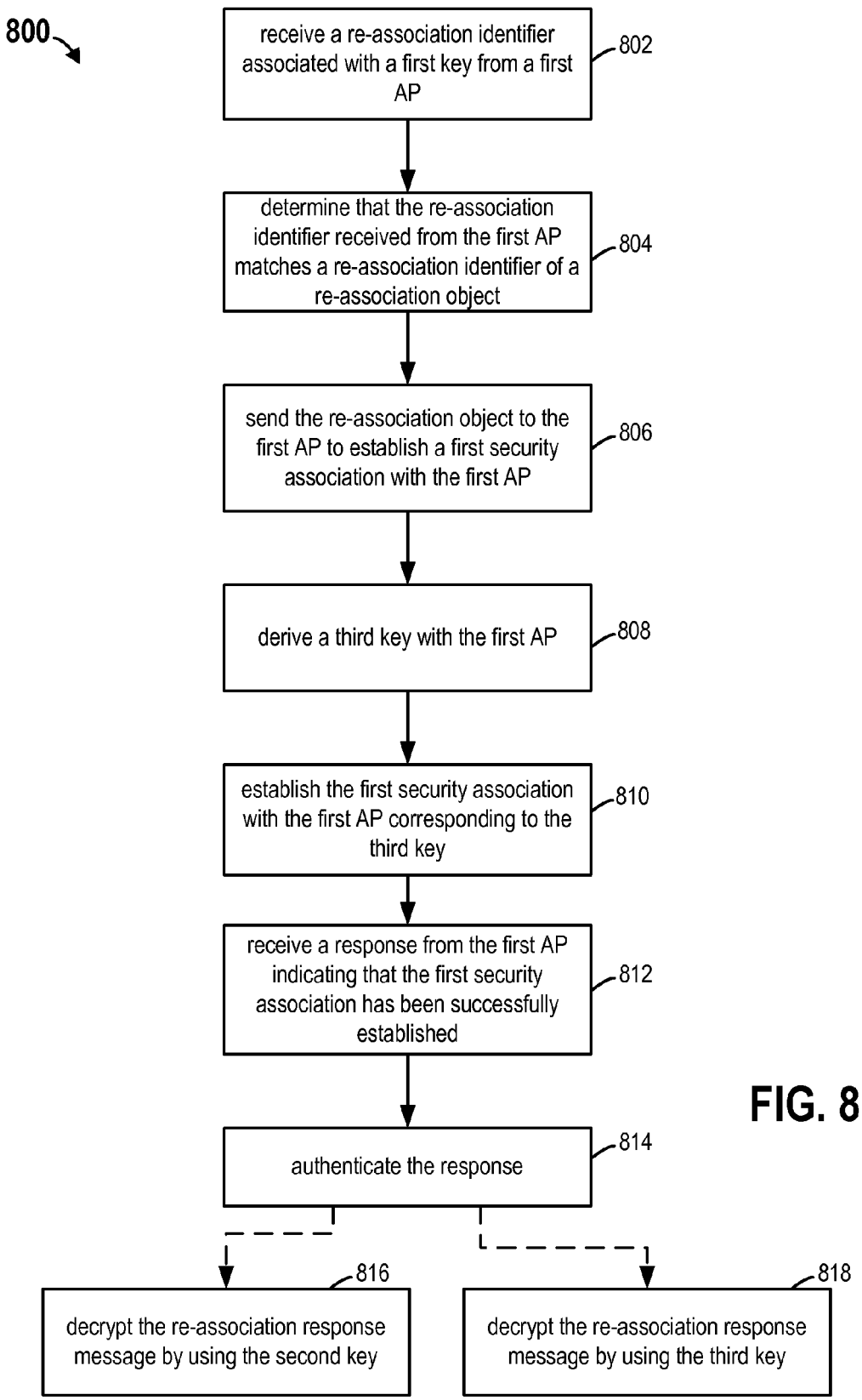
FIG. 8 is a flowchart of an example method of wireless communication for establishing re-association.

FIG. 8 is a flowchart of an example method 800 of wireless communication for establishing re-association. The method 800 may be performed using a STA (e.g., the STA 114 or the wireless device 702, for example). Although the method 800 is described below with respect to the elements of wireless device 702 of FIG. 7, other components may be used to implement one or more of the steps described herein.

In one configuration, at operation 802, the STA may receive a re-association identifier associated with the first key from a first AP. For example, referring to FIG. 2, each of the APs 104, 204, and 206 may announce the RAID associated with the respective secret key used by the AP 104, 204, or 206. In one configuration, at operation 804, the STA may determine that the re-association identifier received from the first AP matches a re-association identifier of a re-association object. For example, referring to FIG. 2, upon receiving the RAID (e.g., through a beacon frame) from an AP 104, 204, or 206, the STA 114 can determine whether a stored re-association object has the same RAID and may be used for fast re-association.

At operation 806, the STA sends a re-association object to the first AP to establish a first security association with the first AP (e.g., at operation 512 of FIG. 5). The re-association object is encrypted by using a first key unknown to the STA. The re-association object includes a second key derived from a second security association in a previous association procedure between the STA and a second AP. In one configuration, the re-association object may include first device specific information. The re-association object may be included in a re-association request message sent from the STA to the first AP. The re-association request message further may include second device specific information associated with the STA. In one configuration, the first and second device specific information each may include a MAC address. In one configuration, the first AP and the second AP are a same AP In one configuration, at operation 808, the STA may derive a third key with the first AP (e.g., at operation 522 of FIG. 5). At operation 810, the STA may establish the first security association with the first AP corresponding to the third key (e.g., at operation 522 of FIG. 5).

At operation 812, the STA receives a response from the first AP indicating that the first security association has been successfully established (e.g., at operation 524 of FIG. 5). In one configuration, the response may be encrypted by using the second key. In one configuration, the response is encrypted by using the third key.

At operation 814, the STA may authenticate the response (e.g., at operation 528 of FIG. 5). To authenticate the response, in one configuration, at operation 816, the STA may decrypt the re-association response message by using the second key. To authenticate the response, in one configuration, at operation 818, the STA may decrypt the re-association response message by using the third key.

Figure 9:
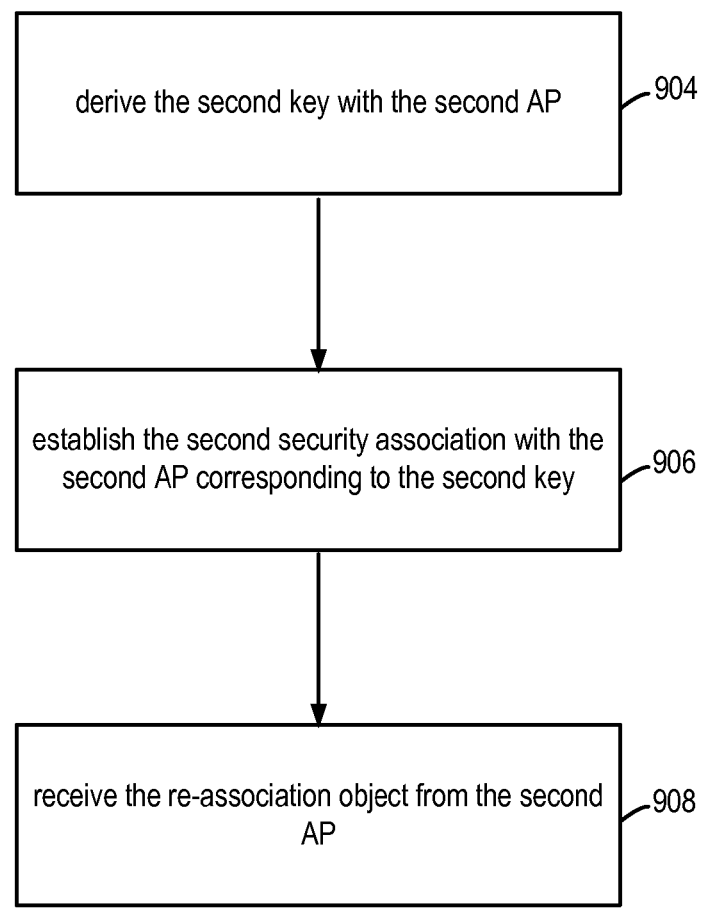
FIG. 9 is a flowchart of an example method of wireless communication for obtaining a re-association object.

FIG. 9 is a flowchart of an example method 900 of wireless communication for obtaining a re-association object. The method 900 may be performed using a STA (e.g., the STA 114 or the wireless device 702, for example). Although the method 900 is described below with respect to the elements of wireless device 702 of FIG. 7, other components may be used to implement one or more of the steps described herein.

The method 900 may be performed prior to operation 806 illustrated in FIG. 8. At operation 904, the STA may derive the second key with the second AP (e.g., at operations 338-350 of FIG. 3). At operation 906, the STA may establish the second security association with the second AP corresponding to the second key. In one configuration, the second security association may be a robust security network association. In one configuration, the second key is a pairwise transient key (PTK). The second security association may be a PTK security association. The re-association object may include information specifying the PTK security association including the PTK. At operation 908, the STA may receive the re-association object from the second AP (e.g., at operation 368 of FIG. 3).

Figure 10:
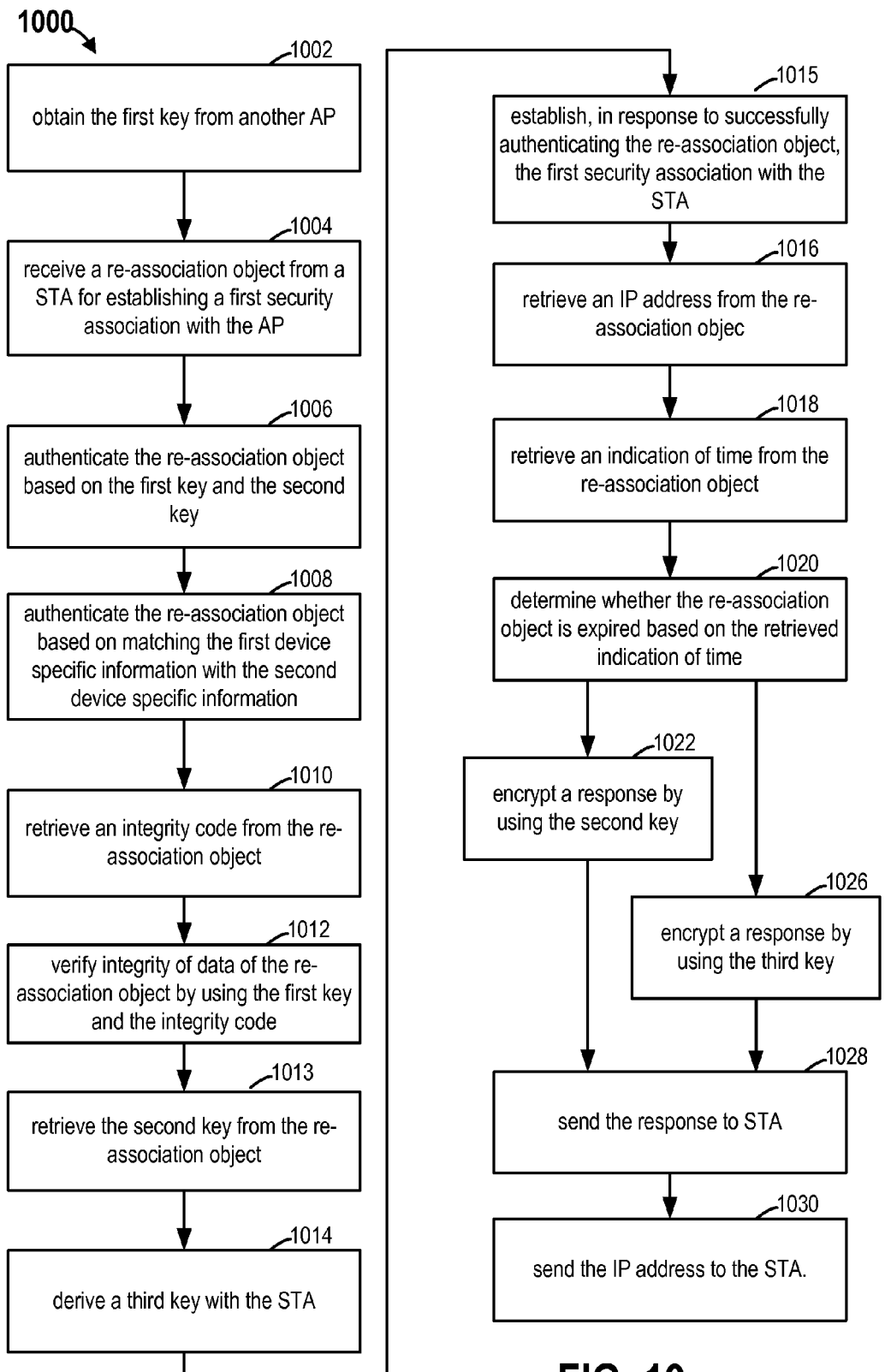
FIG. 10 is a flowchart of another example method of wireless communication for establishing re-association.

FIG. 10 is a flowchart of an example method 1000 of wireless communication for establishing re-association. The method 1000 may be performed using an AP (e.g., the AP 104 or the wireless device 702, for example). Although the method 1000 is described below with respect to the elements of wireless device 702 of FIG. 7, other components may be used to implement one or more of the steps described herein.

In one configuration, at operation 1002, the AP may obtain a first key from another AP. For example, referring to FIG. 2, at operation 292, the AP 104 can share the secret key 234 with the AP 204. At operation 1004, the AP receives a re-association object from a STA for establishing a first security association with the AP (e.g., at operation 512 of FIG. 5). The re-association object is encrypted by using a first key unknown to the STA. The re-association object includes a second key derived from a second security association in a previous association procedure between the STA and an AP.

At operation 1006, the AP authenticates the re-association object based on the first key and the second key (e.g., at operation 516 of FIG. 5). In one configuration, the re-association object may include first device specific information. The re-association object may be included in a re-association request message received from the STA. The re-association request message further may include second device specific information associated with the STA. In one configuration, at operation 1008, the AP may authenticate the re-association object based on matching the first device specific information with the second device specific information (e.g., at operation 516 of FIG. 5).

In one configuration, at operation 1010, the AP may retrieve an integrity code from the re-association object (e.g., at operation 516 of FIG. 5). At operation 1012, The AP may verify integrity of data of the re-association object by using the first key and the integrity code (e.g., at operation 516 of FIG. 5). In one configuration, at operation 1013, the AP may retrieve the second key from the re-association object (e.g., at operation 516 of FIG. 5). In one configuration, the AP may derive a third key with the STA (e.g., at operation 522 of FIG. 5).

At operation 1015, the AP establishes, in response to successfully authenticating the re-association object, the first security association with the STA. In one configuration, the first security association is established according to the second key (e.g., at operation 516 of FIG. 5). In one configuration, the first security association is established according to the third key (e.g., at operation 522 of FIG. 5).

In one configuration, at operation 1016, the AP may retrieve an IP address from the re-association object (e.g., at operation 516 of FIG. 5). The AP may assign the IP address to the STA. At operation 1018, the AP may retrieve, in the re-association procedure, an indication of time from the re-association object (e.g., at operation 516 of FIG. 5). At operation 1020, the AP may determine whether the re-association object is expired based on the retrieved indication of time (e.g., at operation 516 of FIG. 5).

In one configuration, at operation 1022, the AP may encrypt a response indicating the established first security association by using the second key (e.g., at operation 524 of FIG. 5). In one configuration, at operation 1026, the AP may encrypt the response by using the third key. At operation 1028, the AP sends the response to the STA (e.g., at operation 524 of FIG. 5).

Figure 11:
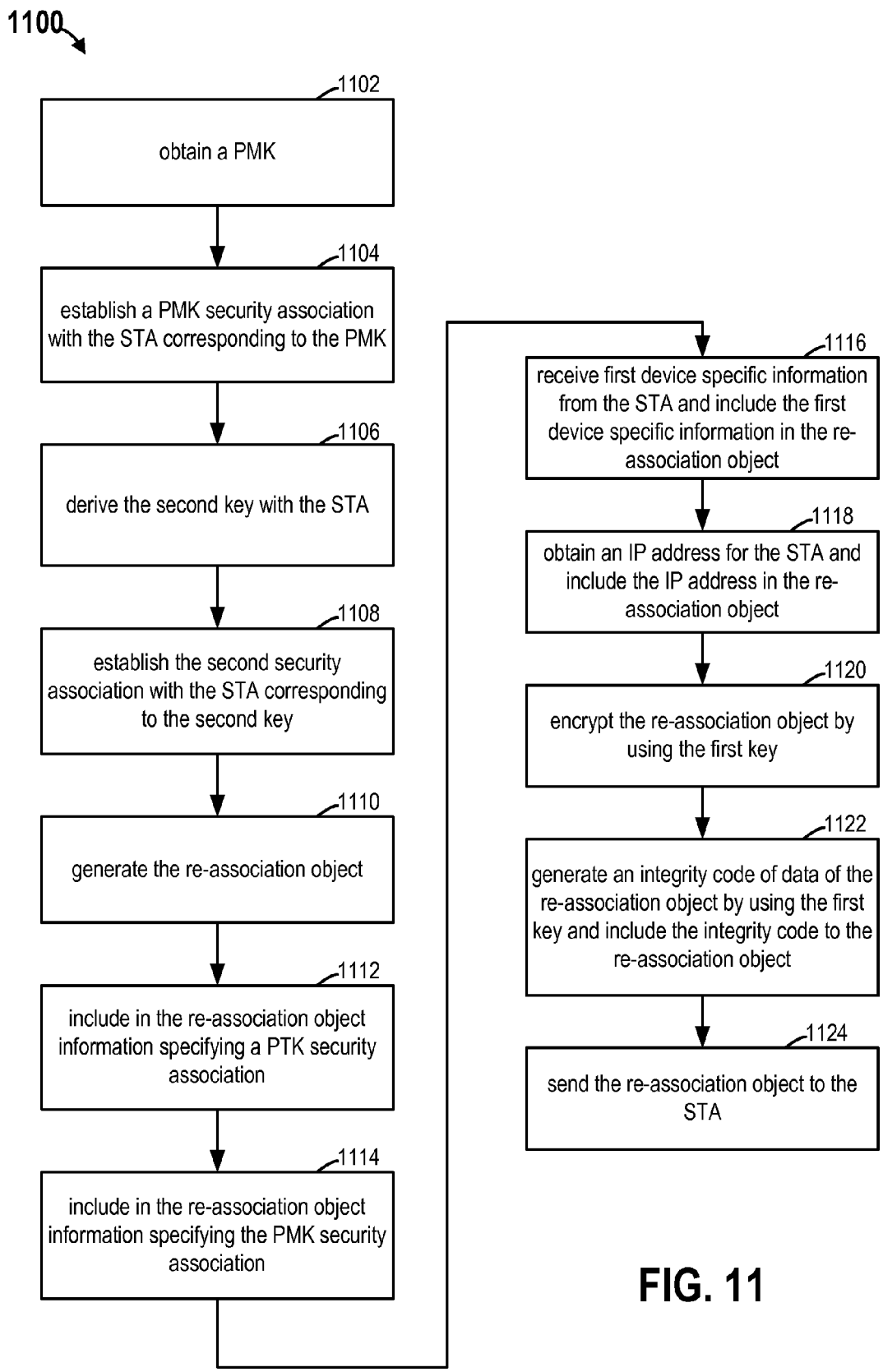
FIG. 11 is a flowchart of an example method of wireless communication for generating a re-association object.

FIG. 11 is a flowchart of an example method 1100 of wireless communication for generating a re-association object. The method 1100 may be performed using an AP (e.g., the AP 104 or the wireless device 702, for example).

Although the method 1100 is described below with respect to the elements of wireless device 702 of FIG. 7, other components may be used to implement one or more of the steps described herein.

In one configuration, at operation 1102, the AP may obtain a PMK (e.g., at operations 338-350 of FIG. 3). At operation 1104, the AP may establish a PMK security association with the STA corresponding to the PMK (e.g., at operations 338-350 of FIG. 3).

In one configuration, at operation 1106, the AP may derive the second key with the STA (e.g., at operations 338-350 of FIG. 3). At operation 1108, the AP may establish the second security association with the STA corresponding to the second key (e.g., at operations 338-350 of FIG. 3). At operation 1110, the AP may generate the re-association object (e.g., at operation 366 of FIG. 3). The AP may encrypt the re-association object by using the first key.

In one configuration, the second key may be a PTK. The second security association may be a PTK security association. At operation 1112, the AP may include in the re-association object information specifying the PTK security association (e.g., at operation 366 of FIG. 3).

In one configuration, at operation 1116, the AP may receive first device specific information from the STA and may include the first device specific information in the re-association object (e.g., at operations 338-350 of FIG. 3). In one configuration, at operation 1118, the AP may obtain an IP address for the STA and may include the IP address in the re-association object (e.g., at operations 362 and 366 of FIG. 3).

In one configuration, at operation 1120, the AP may encrypt the re-association object by using the first key (e.g., at operation 366 of FIG. 3). In one configuration, at operation 1122, the AP may generate an integrity code of data of the re-association object by using the first key and may include the integrity code in the re-association object (e.g., at operation 366 of FIG. 3). At operation 1124, the AP may send the re-association object to the STA (e.g., at operation 366 of FIG. 3).

Figure 12:
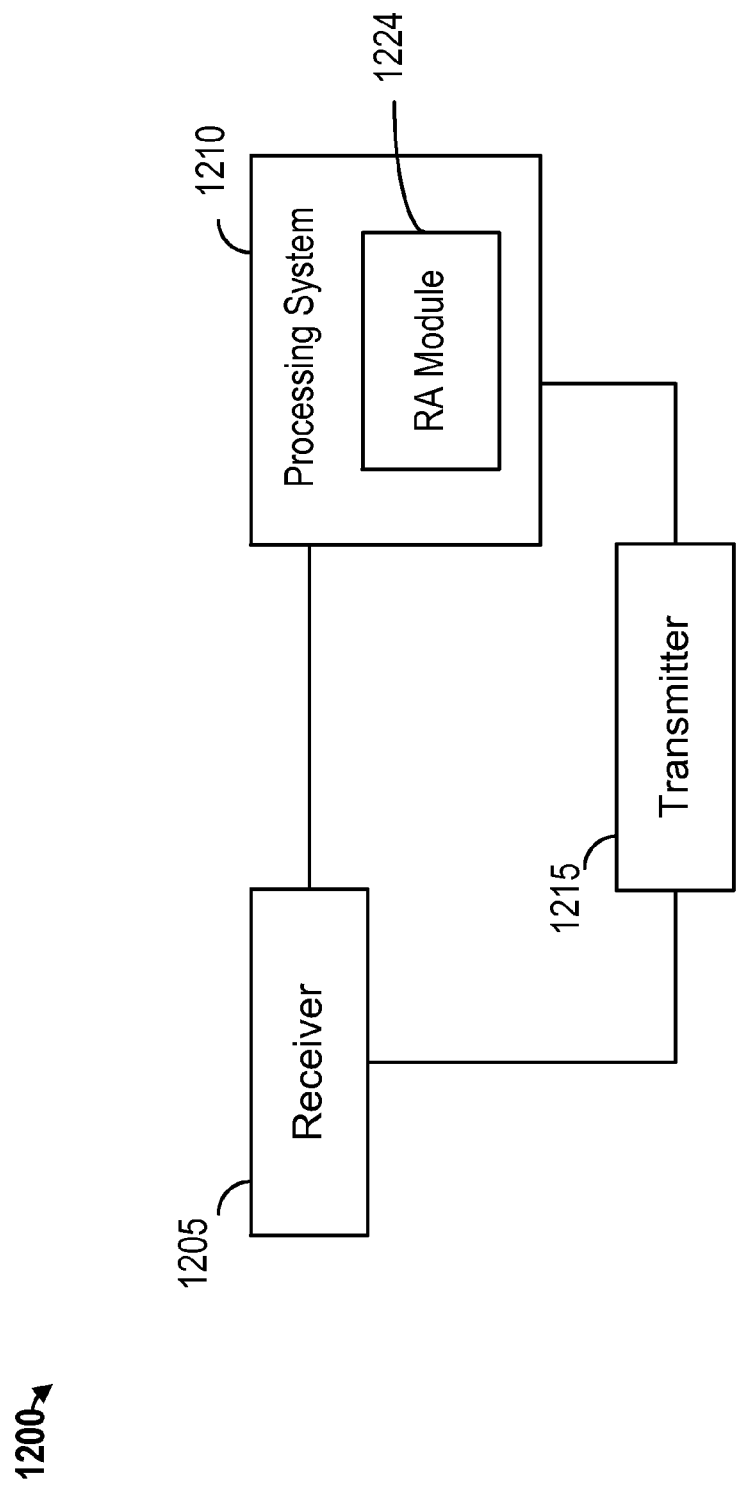
FIG. 12 is a functional block diagram of an example wireless communication device.

FIG. 12 is a functional block diagram of an example wireless communication device 1200. The wireless communication device 1200 may include a receiver 1205, a processing system 1210, and a transmitter 1215. The processing system 1210 may include a RA module 1224. The processing system 1210, the RA module 1224, and/or the receiver 1205 may be configured to measure an energy level of a transmission channel.

In one aspect, the wireless communication device 1200 may be utilized by a STA. The receiver 1205, the processing system 1210, the RA module 1224, and/or the transmitter 1215 may be configured to perform an association procedure with at least one AP including: (a) deriving a first key with the at least one AP, and (b) establishing a security association between the STA and the at least one AP corresponding to the first key. The receiver 1205, the processing system 1210, and/or the RA module 1224 may be configured to receive a re-association object from the at least one AP. The re-association object includes information regarding the security association and is encrypted with a second key unknown to the STA. The receiver 1205, the processing system 1210, the RA module 1224, and/or the transmitter 1215 may be configured to perform a re-association procedure with the at least one AP based on the re-association object.

In one configuration, the processing system 1210, the RA module 1224, and/or the transmitter 1215 may be configured to send a re-association request to an AP. The re-association request includes the re-association object. The receiver 1205, the processing system 1210, and/or the RA module 1224 may be configured to receive a re-association response from the AP. The re-association response is encrypted using the first key. The processing system 1210 and/or the RA module 1224 may be configured authenticate the re-association response based on the first key.

In one configuration, the processing system 1210, the RA module 1224, and/or the transmitter 1215 may be configured to send first device specific information to the AP in the association procedure. The processing system 1210, the RA module 1224, and/or the transmitter 1215 may be configured to send second device specific information to the AP in the re-association procedure. The re-association object includes the first device specific information.

In one configuration, the first and second device specific information each include MAC address. The re-association object includes at least one of a PMK and a PTK. In one configuration, the at least one AP from which the re-association object is received and the AP to which the re-association request is sent are different APs. In one configuration, the at least one AP from which the re-association object is received and the AP to which the re-association request is sent are the same AP. In one configuration, the security association is an RSNA.

In one configuration, the association procedure is performed with a plurality of APs, and a re-association object is received from each of the plurality of APs. The processing system 1210 and/or the RA module 1224 may be configured to selectively store the received re-association object based on a predetermined rule.

In one configuration, the processing system 1210 and/or the RA module 1224 may be configured to determine whether a given received re-association object is encrypted using a key that is the same as a key using which a re-association object already stored at the STA is encrypted. The processing system 1210 and/or the RA module 1224 may be configured to discard the given received re-association object in response to a determination that the given received re-association object is encrypted using the same key.

In one configuration, the processing system 1210, the RA module 1224, and/or the transmitter 1215 may be configured to send a re-association request to an AP. The re-association request includes the re-association object. In one configuration, the processing system 1210 and/or the RA module 1224 may be configured to derive a third key with the AP. The receiver 1205, the processing system 1210, the RA module 1224, and/or the transmitter 1215 may be configured to establish another security association between the STA and the AP corresponding to the third key.

The receiver 1205, the processing system 1210, and/or the RA module 1224 may be configured to receive a re-association response from the AP. The re-association response is encrypted using the third key. The processing system 1210 and/or the RA module 1224 may be configured to authenticate the re-association response based on the third key.

In one configuration, the processing system 1210, the RA module 1224, and/or the transmitter 1215 may be configured to sends a re-association request to an AP. The re-association request includes the re-association object. The receiver 1205, the processing system 1210, and/or the RA module 1224 may be configured to receive a re-association response from the AP. The re-association response is encrypted using the first key. The processing system 1210 and/or the RA module 1224 may be configured to authenticate the re-association response based on the first key. The receiver 1205, the processing system 1210, and/or the RA module 1224 may be configured to receive a third key encrypted using the first key. The receiver 1205, the processing system 1210, and/or the RA module 1224 may be configured to establish another security association with the AP using the third key. In one configuration, the re-association object includes an IP address. The re-association procedure includes associating the STA with the IP address.

In one aspect, the wireless communication device 1200 may be utilized by an AP. The receiver 1205, the processing system 1210, the RA module 1224, and/or the transmitter 1215 may be configured to perform an association procedure with a STA including: (a) deriving a first key with the STA, and (b) establishing a security association between the AP and the STA corresponding to the first key. The processing system 1210, the RA module 1224, and/or the transmitter 1215 may be configured to send a re-association object to the STA. The re-association object includes information regarding the security association and is encrypted with a second key unknown to the STA. The processing system 1210 and/or the RA module 1224 may be configured to perform a re-association procedure with the STA based on the re-association object.

In one configuration, the receiver 1205, the processing system 1210, and/or the RA module 1224 may be configured to receive a re-association request from the STA. The re-association request includes the re-association object. The processing system 1210 and/or the RA module 1224 may be configured to authenticate the re-association object based on the second key unknown to the STA and a PTK retrieved from the re-association object. The processing system 1210, the RA module 1224, and/or the transmitter 1215 may be configured to send a re-association response to the STA upon authenticating the re-association object. The re-association response is encrypted using the first key.

In one configuration, the receiver 1205, the processing system 1210, and/or the RA module 1224 may be configured to receive first device specific information in the association procedure. The receiver 1205, the processing system 1210, and/or the RA module 1224 may be configured to receive second device specific information in the re-association procedure. The re-association object includes the first device specific information. The performing the re-association procedure includes authenticating the re-association object based on first and second device specific information.

In one configuration, the first and second device specific information each include a MAC address. The re-association object includes at least one of a PMK and a PTK. In one configuration, the processing system 1210 and/or the RA module 1224 may be configured to retrieve an IP address from the re-association object. The processing system 1210 and/or the RA module 1224 may be configured to assign the IP address to the STA. The processing system 1210 and/or the RA module 1224 may be configured to include the IP address in the re-association response.

In one configuration, the receiver 1205, the processing system 1210, and/or the RA module 1224 may be configured to receive a re-association request from the STA. The re-association request includes the re-association object. The processing system 1210 and/or the RA module 1224 may be configured to derive a third key with the STA. The receiver 1205, the processing system 1210, the RA module 1224, and/or the transmitter 1215 may be configured to establish another security association between the AP and the STA corresponding to the third key. The processing system 1210 and/or the RA module 1224 may be configured to authenticate the re-association object based on the second key unknown to the STA and a PTK retrieved from the re-association object. The processing system 1210, the RA module 1224, and/or the transmitter 1215 may be configured to send a re-association response to the STA upon authenticating the re-association object. The re-association response is encrypted with the third key.

In one configuration, the receiver 1205, the processing system 1210, and/or the RA module 1224 may be configured to receive a re-association request from the STA. The re-association request includes the re-association object. The re-association object includes the first key. The processing system 1210 and/or the RA module 1224 may be configured to authenticate the re-association object based on the second key unknown to the STA and a PTK retrieved from the re-association object. The processing system 1210, the RA module 1224, and/or the transmitter 1215 may be configured to send a re-association response to the STA upon authenticating the re-association object. The re-association response is encrypted using the first key. The processing system 1210 and/or the RA module 1224 may be configured to generate a third key. The processing system 1210 and/or the RA module 1224 may be configured to encrypt the third key using the first key and send the encrypted third key to the STA. The receiver 1205, the processing system 1210, the RA module 1224, and/or the transmitter 1215 may be configured to establish another security association between the AP and the STA using the third key.

In one configuration, the re-association object is valid for a predetermined period of time. In one configuration, the security association is an RSNA. In one configuration, the processing system 1210 and/or the RA module 1224 may be configured to assign an IP address to the STA. The processing system 1210 and/or the RA module 1224 may be configured to include the IP address in the re-association object.

In one configuration, the receiver 1205, the processing system 1210, and/or the RA module 1224 may be configured to receive a second key unknown to a STA from another AP. The receiver 1205, the processing system 1210, and/or the RA module 1224 may be configured to receive a re-association request from the STA. The re-association request includes a re-association object and second device specific information. The re-association object includes a first key known to the STA and first device specific information. The processing system 1210 and/or the RA module 1224 may be configured to authenticate the re-association object based on the second key and the first and second device specific information. The processing system 1210, the RA module 1224, and/or the transmitter 1215 may be configured to send a re-association response encrypted using the first key to the STA upon authenticating the re-association object.

The receiver 1205, the processing system 1210, the RA module 1224, and/or the transmitter 1215 may be configured to perform one or more operations discussed above with respect to FIGS. 8-11. The receiver 1205 may correspond to the receiver 712. The processing system 1210 may correspond to the processor 704. The transmitter 1215 may correspond to the transmitter 710. The RA module 1224 may correspond to the AP RA module 124, the STA RA module 126, and/or the RA module 724.

Moreover, means for performing an association procedure with at least one AP may comprise the processing system 1210 and/or the RA module 1224. Means for receiving a re-association object from the at least one AP may comprise the receiver 1205, the processing system 1210, and/or the RA module 1224. Means for performing a re-association procedure with the at least one AP based on the re-association object may comprise the receiver 1205, the processing system 1210, the RA module 1224, and/or the transmitter 1215.

Means for performing an association procedure with a STA may comprise the processing system 1210 and/or the RA module 1224. Means for sending a re-association object to the STA may comprise the processing system 1210, the RA module 1224, and/or the transmitter 1215. Means for performing a re-association procedure with the STA based on the re-association object may comprise the receiver 1205, the processing system 1210, the RA module 1224, and/or the transmitter 1215.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication at a station (STA), comprising:
   receiving a re-association identifier identifying a first key from a first access point (AP);
   determining that the re-association identifier received from the first AP matches a re-association identifier of a re-association object;
   sending, in a re-association procedure, the re-association object to the first AP to establish a first security association with the first AP, wherein the re-association object is sent to the first AP in response to the determination that the re-association identifier received from the first AP matches the re-association identifier of the re-association object, wherein the re-association object is encrypted using the first key unknown to the STA, and wherein the re-association object includes a second key derived from a second security association in a previous association procedure between the STA and a second AP;

receiving a response from the first AP indicating that the first security association has been successfully established; and authenticating the response.

2. The method of claim 1, comprising:

deriving, in the previous association procedure, the second key with the second AP;

establishing the second security association with the second AP corresponding to the second key; and receiving the re-association object from the second AP.

3. The method of claim 2, wherein the second security association is a robust security network association (RSNA).

4. The method of claim 2, wherein the second key is a pairwise transient key (PTK), wherein the second security association is a PTK security association, and wherein the re-association object includes information specifying the PTK security association including the PTK.

5. The method of claim 1, wherein the re-association object includes first device specific information, wherein the re-association object is included in a re-association request message sent from the STA to the first AP, and wherein the re-association request message further includes second device specific information associated with the STA.

6. The method of claim 5, wherein the first and second device specific information each include a media access control (MAC) address.

7. The method of claim 1, wherein the first AP and the second AP are a same AP.

8. The method of claim 1, wherein the response is encrypted by using the second key, wherein the authenticating the response includes decrypting the re-association response message by using the second key.

9. The method of claim 1, comprising:

deriving, in the re-association procedure, a third key with the first AP;

establishing the first security association with the first AP corresponding to the third key, wherein the response is encrypted by using the third key, and wherein the authenticating the response includes decrypting the re-association response message by using the third key.

10. An apparatus for wireless communication, the apparatus being a station (STA), comprising:

means for receiving a re-association identifier identifying a first key from a first access point (AP);

means for determining that the re-association identifier received from the first AP matches a re-association identifier of a re-association object;

means for sending, in a re-association procedure, the re-association object to the first AP to establish a first security association with the first AP, wherein the re-association object is sent to the first AP in response to the determination that the re-association identifier received from the first AP matches the re-association identifier of the re-association object, wherein the re-association object is encrypted using the first key unknown to the STA, and wherein the re-association object includes a second key derived from a second security association in a previous association procedure between the STA and a second AP;

means for receiving a response from the first AP indicating that the first security association has been successfully established; and means for authenticating the response.

11. The apparatus of claim 10, comprising:

means for deriving, in the previous association procedure, the second key with the second AP;

means for establishing the second security association with the second AP corresponding to the second key; and means for receiving the re-association object from the second AP.

12. The apparatus of claim 11, wherein the second security association is a robust security network association (RSNA).

13. The apparatus of claim 11, wherein the second key is a pairwise transient key (PTK), wherein the second security association is a PTK security association, and wherein the re-association object includes information specifying the PTK security association including the PTK.

14. The apparatus of claim 10, wherein the re-association object includes first device specific information, wherein the re-association object is included in a re-association request message sent from the STA to the first AP, and wherein the re-association request message further includes second device specific information associated with the STA.

15. The apparatus of claim 14, wherein the first and second device specific information each include a media access control (MAC) address.

16. The apparatus of claim 10, wherein the first AP and the second AP are a same AP.

17. The apparatus of claim 10, wherein the response is encrypted by using the second key, wherein the means for authenticating the response is configured to decrypt the re-association response message by using the second key.

18. The apparatus of claim 10, comprising:

means for deriving, in the re-association procedure, a third key with the first AP;

means for establishing the first security association with the first AP corresponding to the third key, wherein the response is encrypted by using the third key, and wherein the means for authenticating the response is configured to decrypt the re-association response message by using the third key.

19. An apparatus for wireless communication, the apparatus being a station (STA), comprising:

a memory; and at least one processor coupled to the memory and configured to:

receive a re-association identifier identifying a first key from a first access point (AP);

determine that the re-association identifier received from the first AP matches a re-association identifier of a re-association object;

send, in a re-association procedure, the re-association object to the first AP to establish a first security association with the first AP, wherein the re-association object is sent to the first AP in response to the determination that the re-association identifier received from the first AP matches the re-association identifier of the re-association object, wherein the re-association object is encrypted using the first key unknown to the STA, and wherein the re-association object includes a second key derived from a second security association in a previous association procedure between the STA and a second AP;

receive a response from the first AP indicating that the first security association has been successfully established; and authenticate the response.

20. The apparatus of claim 19, wherein the at least one processor is configured to:

derive, in the previous association procedure, the second key with the second AP;

establish the second security association with the second AP corresponding to the second key; and receive the re-association object from the second AP.

21. The apparatus of claim 20, wherein the second security association is a robust security network association (RSNA).

22. The apparatus of claim 20, wherein the second key is a pairwise transient key (PTK), wherein the second security association is a PTK security association, and wherein the re-association object includes information specifying the PTK security association including the PTK.

23. The apparatus of claim 19, wherein the re-association object includes first device specific information, wherein the re-association object is included in a re-association request message sent from the STA to the first AP, and wherein the re-association request message further includes second device specific information associated with the STA.

24. The apparatus of claim 23, wherein the first and second device specific information each include a media access control (MAC) address.

25. The apparatus of claim 19, wherein the first AP and the second AP are a same AP.

26. The apparatus of claim 19, wherein the response is encrypted by using the second key, wherein to authenticate the response the at least one processor is configured to decrypt the re-association response message by using the second key.

27. The apparatus of claim 19, wherein the at least one processor is configured to:

derive, in the re-association procedure, a third key with the first AP;

establish the first security association with the first AP corresponding to the third key, wherein the response is encrypted by using the third key, and wherein to authenticate the response the at least one processor is configured to decrypt the re-association response message by using the third key.

28. A computer-readable medium storing computer executable code for wireless communication at a station (STA), comprising code for:

receiving a re-association identifier identifying a first key from a first access point (AP);

determining that the re-association identifier received from the first AP matches a re-association identifier of a re-association object;

sending, in a re-association procedure, the re-association object to the first AP to establish a first security association with the first AP, wherein the re-association object is sent to the first AP in response to the determination that the re-association identifier received from the first AP matches the re-association identifier of the re-association object, wherein the re-association object is encrypted using the first key unknown to the STA, and wherein the re-association object includes a second key derived from a second security association in a previous association procedure between the STA and a second AP;

receiving a response from the first AP indicating that the first security association has been successfully established; and authenticating the response.

29. The computer-readable medium of claim 28, further comprising code for:

deriving, in the previous association procedure, the second key with the second AP;

establishing the second security association with the second AP corresponding to the second key; and receiving the re-association object from the second AP.

30. The computer-readable medium of claim 29, wherein the second security association is a robust security network association (RSNA).

31. The computer-readable medium of claim 29, wherein the second key is a pairwise transient key (PTK), wherein the second security association is a PTK security association, and wherein the re-association object includes information specifying the PTK security association including the PTK.

32. The computer-readable medium of claim 28, wherein the re-association object includes first device specific information, wherein the re-association object is included in a re-association request message sent from the STA to the first AP, and wherein the re-association request message further includes second device specific information associated with the STA.

33. The computer-readable medium of claim 32, wherein the first and second device specific information each include a media access control (MAC) address.

34. The computer-readable medium of claim 28, wherein the first AP and the second AP are a same AP.

35. The computer-readable medium of claim 28, wherein the response is encrypted by using the second key, wherein the authenticating the response includes decrypting the re-association response message by using the second key.

36. The computer-readable medium of claim 28, further comprising code for:

deriving, in the re-association procedure, a third key with the first AP;

establishing the first security association with the first AP corresponding to the third key, wherein the response is encrypted by using the third key, and wherein the authenticating the response includes decrypting the re-association response message by using the third key.

* * * * *